United States Patent [19]

Hesse et al.

[11] Patent Number: 5,512,884

[45] Date of Patent: Apr. 30, 1996

[54] USER REQUESTED COMMUNICATION RESOURCE ALLOCATION

[75] Inventors: Gregory N. Hesse, Hanover Park; Daniel J. McDonald, Cary, both of Ill.

[73] Assignee: Motorola Inc., Schaumburg, Ill.

[21] Appl. No.: 428,786

[22] Filed: Apr. 21, 1995

Related U.S. Application Data

[63] Continuation of Ser. No. 858,251, Mar. 26, 1992, abandoned.

[51] Int. Cl.⁶ .................................................. H01H 67/00
[52] U.S. Cl. .................. 340/825.03; 455/33.1; 455/34.1; 379/60; 370/58.1
[58] Field of Search .............. 340/825.03, 825.04, 340/825.47, 825.49; 455/11.1, 16, 33.1, 34.1; 379/58, 59, 60, 62; 370/60, 94.1, 58.1, 58.2

[56] References Cited

U.S. PATENT DOCUMENTS

| | | | |
|---|---|---|---|
| 4,870,408 | 9/1989 | Zdunek et al. | 340/825.03 |
| 4,896,319 | 1/1990 | Lidinsky et al. | 379/94.1 |
| 5,025,254 | 6/1991 | Hess | 340/826 |
| 5,126,733 | 6/1992 | Sagers et al. | 340/825.47 |
| 5,163,158 | 11/1992 | Tendler et al. | 455/11.1 |
| 5,214,789 | 5/1993 | George | 379/60 |
| 5,235,598 | 8/1993 | Sasuta | 340/825.03 |
| 5,235,631 | 8/1993 | Grube et al. | 379/58 |
| 5,254,986 | 10/1993 | DeLuca | 340/825.47 |
| 5,279,521 | 1/1994 | Johlie et al. | 455/34.1 |
| 5,287,542 | 2/1994 | Hesse et al. | 455/34.1 |
| 5,299,198 | 3/1994 | Kay et al. | 455/33.1 |

Primary Examiner—Douglas W. Olms
Assistant Examiner—Shick Hom
Attorney, Agent, or Firm—Susan L. Lukasik

[57] ABSTRACT

In a multi-site communication system, a communication unit (106) transmits a communication request (208) that includes information identifying the sites (100 and/or 101) where the user desires to communicate with members of his user group. Communication resources are allocated (308) using the communication request and current resource allocation for the user group.

22 Claims, 4 Drawing Sheets

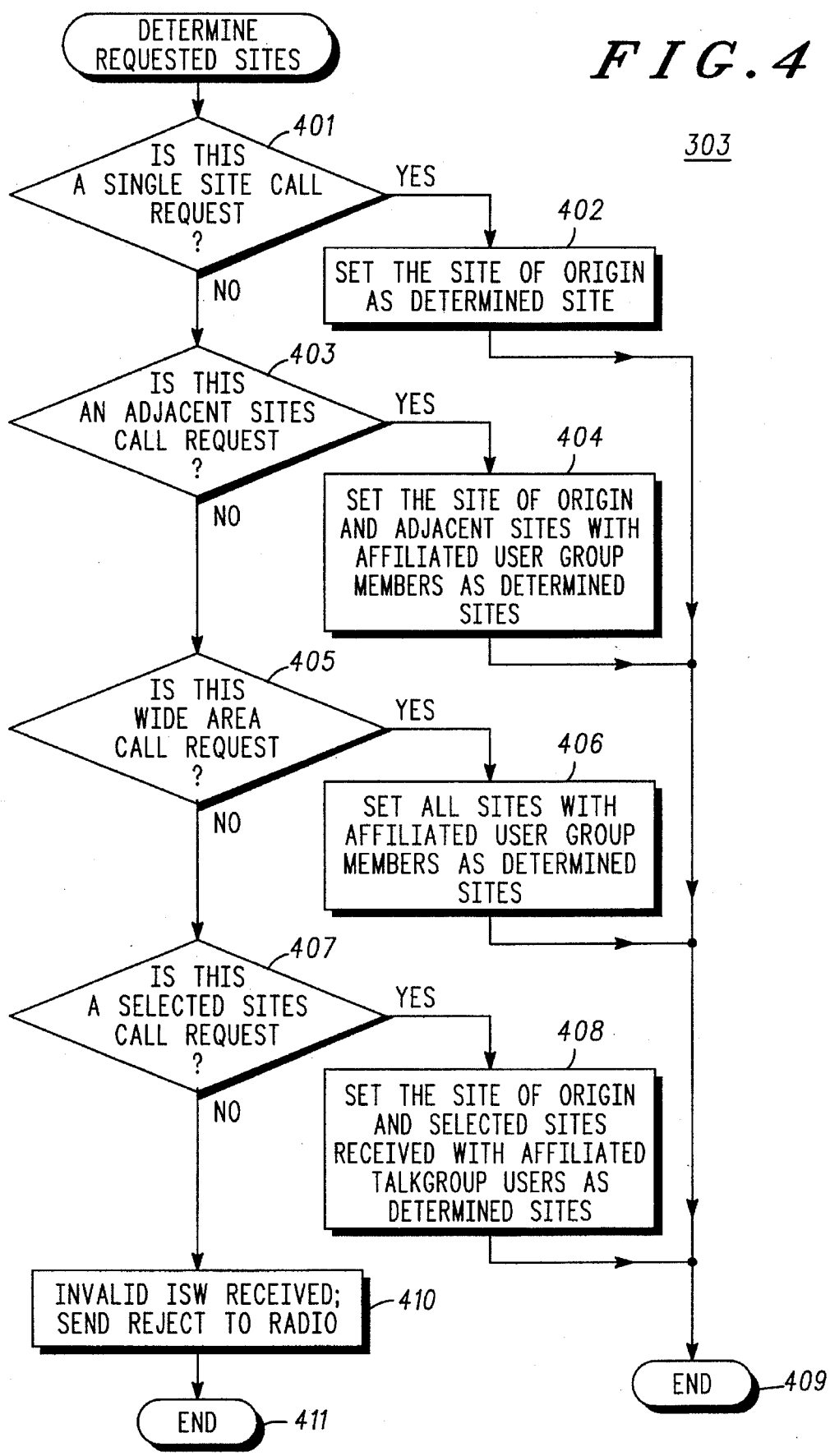

USER REQUESTED COMMUNICATION RESOURCE ALLOCATION

This is a continuation of application Ser. No. 07/858,251, filed Mar. 26, 1992 and now abandoned.

FIELD OF THE INVENTION

This invention relates to communication systems, including but not limited to allocation of resources in trunked communication systems.

BACKGROUND OF THE INVENTION

Trunked communication systems are known to comprise a plurality of communication units, a limited number of communication resources that are transceived via a predetermined number of repeaters, or base stations, and a communication resource allocator that allocates the limited number of communication resources among the plurality of communication units. The communication resources may comprise a TDM bus, a carrier frequency, a pair of carrier frequencies, or any RF transmission means. Of the communication resources, one is selected as the control channel which transceives operational data between the communication resource allocator and the communication units. The communication units, which may be portable radios and/or mobile radios, are arranged into talkgroups, also called user groups, by commonality of use. For example, a user group may comprise communication units that are operated by a police department while another user group comprises communication units operated by a fire department.

In a multi-site trunked communication system, the sites included in a call are predetermined based on the classification of the user group or individual. If the call is classified as a wide-area call, a channel is assigned at multiple sites. If the call is classified as a site or local call, only one site assigns a channel. The radio user has no control over the call sites once the classifications are set up.

Sometimes a radio user knows that the parties to be reached are at his own site or adjacent sites. Nevertheless, if the call is classified as a wide-area call, the user is assigned channels at the site of origin and all other wide-area sites that the user group utilizes. This wastes channels at other sites and can delay the call while waiting for channels to become free at all wide-area sites. It would be quicker and more channel efficient if only one channel was assigned at the site of origin and/or at adjacent sites where the users are located. This would be especially useful, for example, for a utility company that is trying to fix a local problem when the users only need to talk to local user group members. Therefore, a method of resource allocation based on user information is desired.

BRIEF DESCRIPTION OF THE DRAWINGS

FIG. 4 is a flowchart showing determination of requested sites by a central controller in accordance with the invention.

DESCRIPTION OF A PREFERRED EMBODIMENT

The following describes a method and apparatus that enables a communication unit to request sites in a communication system for a communication. The request is processed by a central controller that allocates the appropriate sources upon availability.

Figure 1:
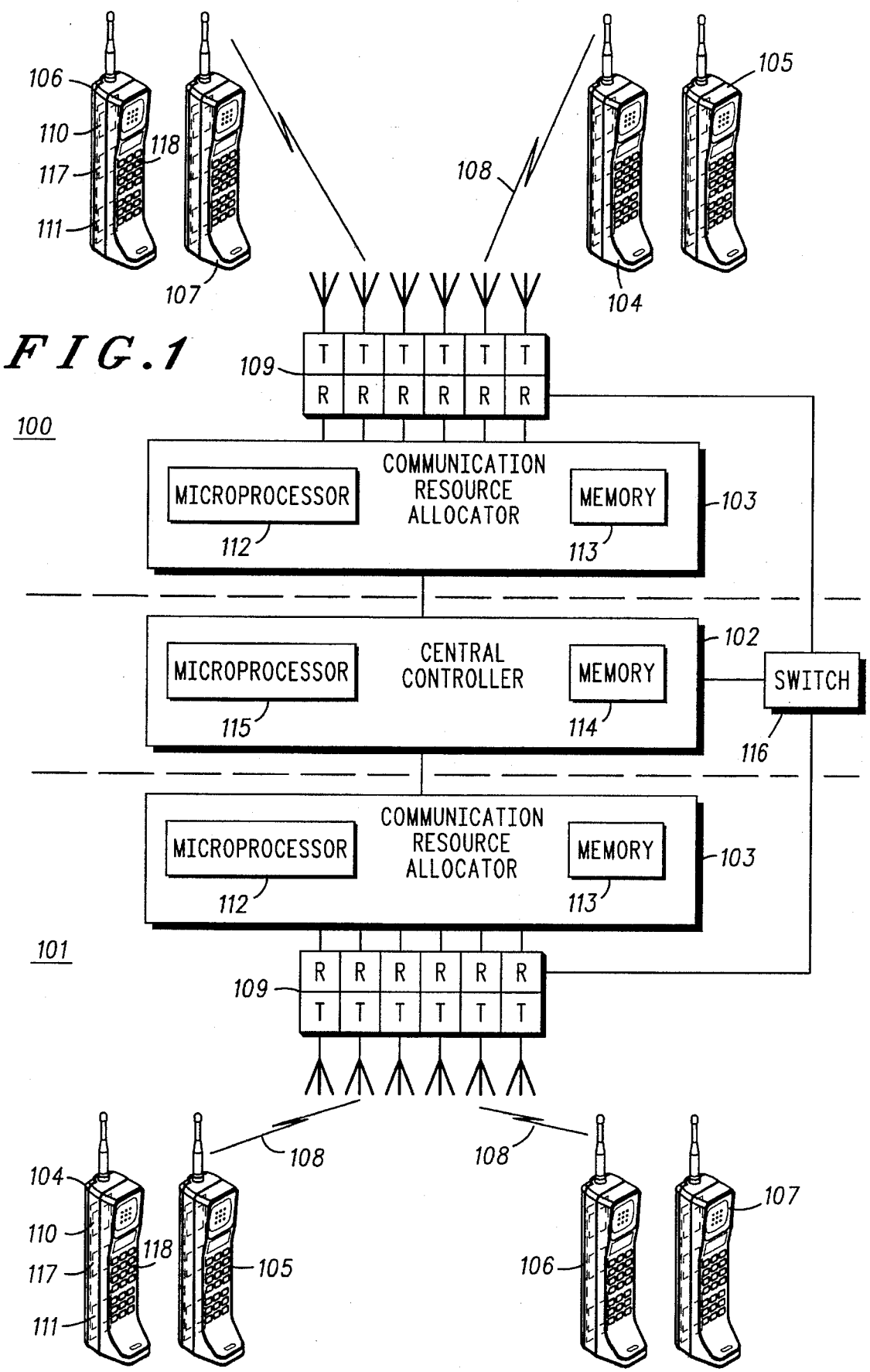
FIG. 1 illustrates a communication system network in accordance with the invention.

FIG. 1 illustrates a trunked communication system including a plurality of communication sites 100 and 101 (only two shown) that are operably coupled via a central controller 102. Each communication site comprises a communication resource allocator 103, a plurality of communication units (only four shown) 104–107, a limited number of communication resources 108, and a limited number of repeaters, or base stations, 109.

Each communication resource allocator 103, which may be a Motorola remote central site controller, comprises at least one microprocessor 112, which may be a Motorola 6809 microprocessor, and a digital storage memory device 113 that may be RAM, ROM or any other type of means for storing digital information. Each of the communication resources 108 are transceived between the communication units 104–107 and the communication resource allocator 103 via the repeaters 109. One of the communication resources functions as a control channel that transceives trunked communication system control data between the communication resource allocator 103 and the communication units 104–107.

Each of the communication units 104–107, which may be a Motorola STX portable radio, comprises at least one microprocessor 110, which may be a Motorola 68HC11 microprocessor, and a digital storage memory device 111 that may be RAM, ROM or any other type of means for storing digital information. Each unit 104–107 also comprises an input mechanism 118, which may be a switch, keypad, or any other means for entering information, and transmitting means 117 that transmit communications, such as communication resource requests, on the communication resources 108. The communication units 104–107 are configured into user groups, wherein two or more communication units form a user group.

In the communication system, a communication unit can operate in any of the communication sites of the network. This is generally accomplished by the communication resource allocator 103 of each communication site communicating with a hub computer network, or central controller 102, a technique that is well known in the art. The central controller 102 comprises at least one microprocessor 115, which may be a Motorola 68040 microprocessor, and a digital storage memory device 114 that may be RAM, ROM or any other type of means for storing digital information. The repeaters 109 in each communication site 100 and 101 are connected to a switch 116 which is under the control of the central controller 102. The switch 116 consists of a switch matrix or other means to route audio from one port to another as is known in the art.

When the user of a communication unit 104 in the coverage area of one site 101 wishes to talk to others in his user group, who may be in the coverage area of another site 100, the unit 104 transmits an inbound signalling word (ISW) to the communication resource allocator 103 of the communication site 101 in which it resides. The communication resource allocator 103 and central controller 102 process the ISW, as is known in the art, and allocate a communication resource 108 to the user group for the communication unit 104. The present invention provides a method that allows a communication unit 104 to specifically request certain sites in which communication resources 108 are to be allocated.

Figure 2:
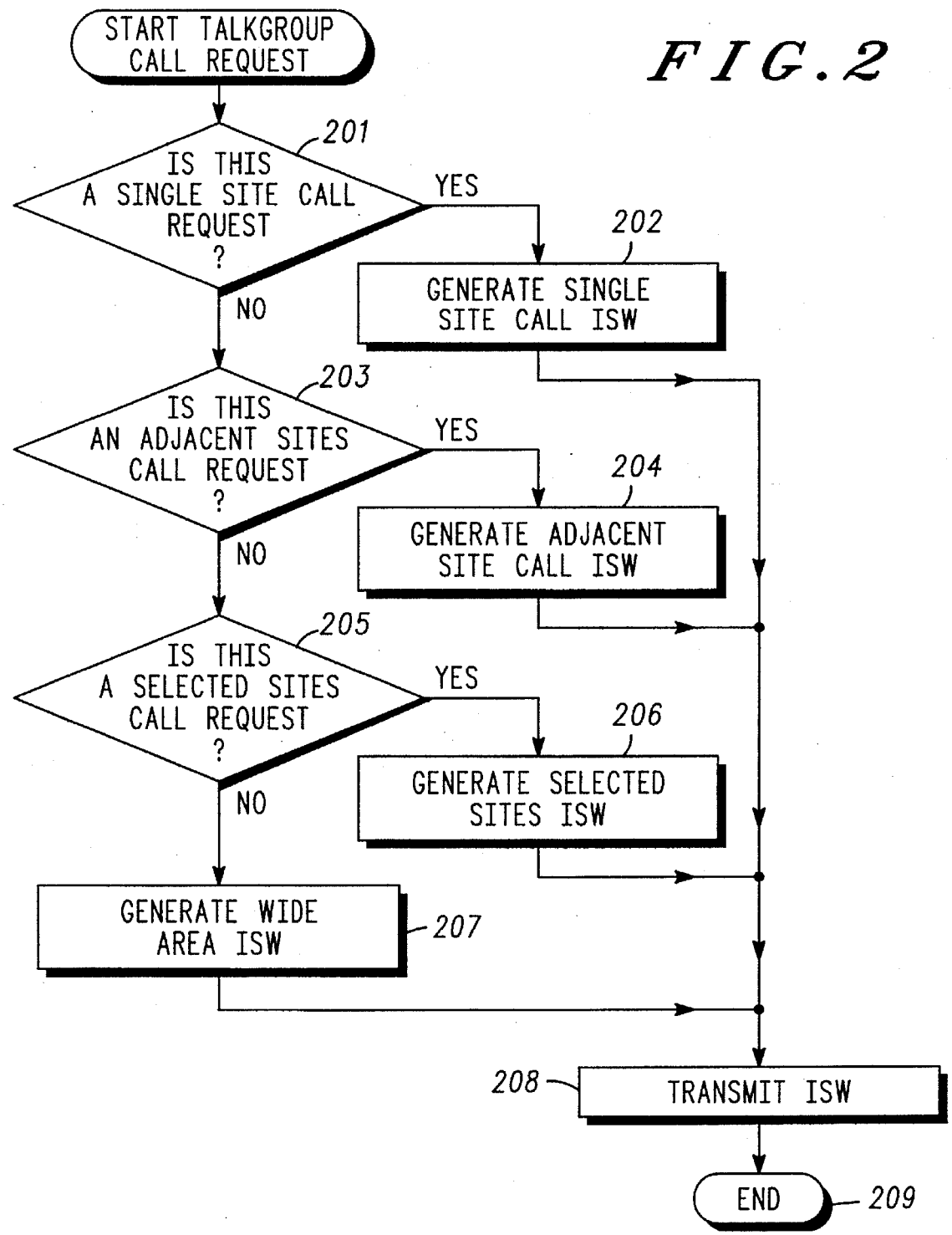
FIG. 2 is a flowchart showing communication request generation by a communication unit in accordance with the invention.

The steps for generating a talkgroup communication request by a communication unit 104 are presented in the flowchart of FIG. 2. The steps of the flowchart are performed by a controller that incorporates the microprocessor 110 and memory 111 of the communication unit 104. After the user enters the type of call request via the input mechanism 118 of the communication unit 104, the controller of the communication unit 104 processes the entered information. At step 20 1, the controller determines if the entered information is a single site call request. A single site call request typically includes an identification of a single site, usually the site 101 in which the requesting communication unit 104 resides. If at step 201 a single site call request is identified, the controller generates at step 202 a single site call ISW, which requests a resource to be sourced at the identified site, by including identifying information corresponding to the entered information, and the process continues with step 208. The identifying information may include a specific site identification (ID) or an alias for the site that is also stored in the central controller 102.

If at step 201 a single site call request is not identified, the controller determines at step 203 if the entered information is an adjacent sites call request. An adjacent sites call request typically includes an identification of a first site 101 in which the requesting communication unit 104 resides anti other sites adjacent to the first site 101. If at step 203 an adjacent sites call request is identified, the controller generates at step 204 an adjacent sites call ISW, which requests a resource to be sourced at the identified sites, by including identifying information corresponding to the entered information, and the process continues with step 208. The identifying information may include specific site IDs for the first site and the adjacent sites, or an alias for the first site and a lookup table of the adjacent sites for each site, as stored in the central controller 102.

If at step 203 an adjacent sites call request is not identified, the controller determines at step 205 if the entered information is a selected sites call request. A selected sites call request typically includes one or more identifications of sites, usually including the site 101 in which the requesting communication unit 104 resides. If at step 205 a selected sites call request is identified, the controller generates at step 206 a selected sites call ISW, which requests a resource to be sourced at the identified sites, by including identifying information corresponding to the entered information, and the process continues with step 208. The identifying information may include specific site IDs or aliases for the sites that are stored in the central controller 102.

If at step 205 a selected sites call request is not identified, then it is assumed that a wide-area communication is desired, and the controller generates a wide-area ISW at step 207, and the process continues with step 208. A wide-area communication is a communication that is sourced at all of the sites in the communication system (usually only the sites with affiliated user group members), and may be the default request for the communication unit 104, i.e., the user need not enter information. After the appropriate ISW is generated, the ISW is transmitted at step 208, and the process ends at step 209.

Figure 3:
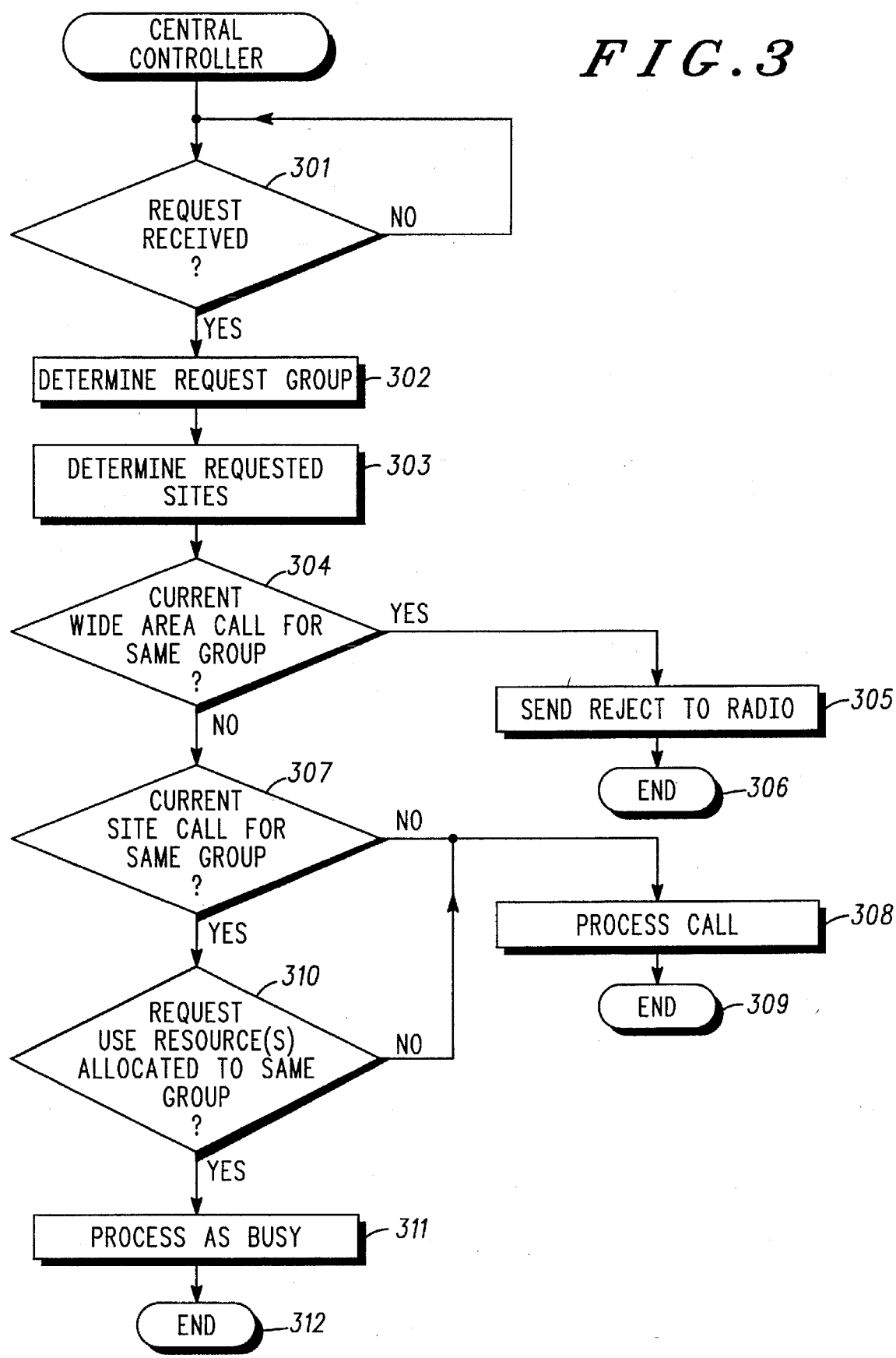
FIG. 3 is a flowchart showing allocation of resources based on a communication request in accordance with the invention.

The flowchart of FIG. 3 presents the steps for allocating resources based on a communication request, as performed by the central controller 102 within its microprocessor 115 and memory 114. If at step 301 the central controller 102 does not receive a communication request, the process continues with step 301. If at step 301 the central controller 102 receives a communication request, the central controller 102 determines at step 302 which user group should be involved in the communication based on the user group information contained in the communication request, as is known in the art. At step 303, the central controller 102 determines what sites are requested by the identifying information contained in the communication request, which method appears in the flowchart and description of FIG. 4.

At step 304, the central controller 102 determines if a wide-area communication (call) is currently in progress for the same user group in the communication request, If at step 304 a wide-area call for the same group is currently in progress, at step 305 the central controller 102 denies the communication request and sends a request reject to the requesting radio, as is known in the art, and the process ends at step 306.

If at step 304 a wide-area call for the same group is not currently in progress, the central controller 102 determines at step 307 if there is a non-wide area communication (site call) including members of the same requested user group currently in progress. If at step 307 there is no site call including members of the same user group currently in progress, the communication request is processed at step 308 such that a communication resource is allocated at each site requested when at least one member of the user group is active at the site, and the process ends at step 309. Communication resource allocation is known in the art.

If at step 307 there is a site call including members of the same user group currently in progress, the central controller 102 determines at step 310 if the new communication request designates one or more of the sites currently supporting members of the same user group. The central controller 102 maintains a database (within its microprocessor 115 and memory 114) of which sites are assigned communication resources for each user group involved in a communication, as is well known in the art. If at step 310 the new communication request does not request one or more of the sites already supporting members of the same user group, the communication request is processed at step 308 such that a communication resource is allocated at each site requested when at least one member of the user group is active at the site, and the process ends at step 309. If at step 310 the new communication request requests one or more of the sites already supporting members of the same user group, the communication request is processed at step 311 as if the resources are currently unavailable (busy condition), and the process ends at step 312. Many different methods of processing a busy exist and are well known in the art, any of which may be applied.

The steps of the flowchart of FIG. 4 show how the central controller 102 determines, at step 303 of FIG. 3, which sites are requested for a communication. At step 401, the central controller 102 determines if the identifying information indicates that this is a single site call request. If at step 401 this is a single site call request, the central controller 102 sets the site of origin at step 402 as the determined (requested) site where communication resources 108 should be allocated, and the process of FIG. 4 ends at step 409, after which the process of FIG. 3 continues with step 304. The central controller 102 should always know the site of origin of the communication request because it knows which communication resource allocator 103 sent the request to the central controller 102.

If at step 401 this is not a single site call request, the central controller 102 determines if the identifying information indicates that this is an adjacent sites call request at step 403. If at step 403 this is an adjacent sites call request, the central controller 102 sets the site of origin and adjacent sites with affiliated user group members at step 404 as the determined (requested) sites where communication resources 108 should be allocated, and the process of FIG. 4 ends at step 409, after which the process of FIG. 3 continues with step 304.

If at step 403 this is not an adjacent sites call request, the central controller 102 determines if the identifying information indicates that this is a wide-area call request at step 405. If at step 405 this is a wide-area call request, the central controller 102 sets all sites where at least one member of the user group is active at step 404 as the determined (requested) sites where communication resources 108 should be allocated, and the process of FIG. 4 ends at step 409, after which the process of FIG. 3 continues with step 304.

If at step 405 this is not a wide-area call request, the central controller 102 determines if the identifying information indicates that this is a selected sites call request at step 407. If at step 407 this is a selected sites call request, the central controller 102 sets the site of origin and all selected sites where at least one member of the user group is active at step 408 as the determined (requested) sites where communication resources 108 should be allocated, and the process of FIG. 4 ends at step 409, after which the process of FIG. 3 continues with step 304. If at step 407 this is not a selected sites call request, the central controller 102 assumes the request is an invalid ISW and sends an invalid call request reject to the communication unit 104, and the process ends at step 411.

Because a user identifies the targeted parties for a call based on the needs of the individual call, the central controller need not assign a channel at every site, thus resources are used more efficiently because fewer resources need be allocated when the present invention is applied. Resource allocation is also faster for certain calls, because only one resource may be required, and the requesting member need not wait for resources at other sites to become available. At the same time, this embodiment will also support the communication needs of a user who does not know what specific sites should be identified. Therefore, all users are accommodated.

What is claimed is:

1. A method of allocating communication resources amongst a plurality of users belonging to a user group in a communication system having a plurality of sites, wherein each site includes at least one communication resource that is allocatable to support a communication within an associated coverage area, comprising the steps of:
identifying, by a communication unit, sites where communication resources should be allocated when at least one member of the user group is active therein, yielding identifying information;
generating, by the communication unit, a communication request, comprising the identifying information;
transmitting, by the communication unit, the communication request; and
allocating, by the communication system, communication resources using the communication request.

2. The method of claim 1, wherein the identifying information comprises an identification of the site wherein the communication unit sourced the communication request.

3. The method of claim 1, where the identifying information comprises an identification of a first site wherein the communication unit sourced the communication request and other sites that are adjacent to the first site.

4. The method of claim 1, wherein the identifying information comprises an identification of specific sites.

5. The method of claim 1, wherein the identifying information comprises an indication that a wide-area communication is desired.

6. The method of claim 1, wherein the identifying information comprises any one of:
A) an identification of the site wherein the communication unit sourced the communication request;
B) an identification of a first site wherein the communication unit sourced the communication request and other sites that are adjacent to the first site;
C) an identification of specific sites; and
D) an indication that a wide-area communication is desired.

7. A method of allocating communication resources in a communication system having a plurality of sites, wherein each site includes at least one communication resource that is allocatable to support a communication within an associated coverage area, comprising the steps of:
at a communication unit:
    identifying which of the plurality of sites the communication unit desires communication support in, yielding a site assignment request;
    generating a communication request, comprising the site assignment request and sourcing the communication request; and
at a central controller:
    processing the site assignment request and assigning communication resources in at least some of the sites that have been identified by the communication unit.

8. The method of claim 7, wherein the site assignment request comprises an identification of the site wherein the communication unit sourced the communication request.

9. The method of claim 7, where the site assignment request comprises an identification of a first site wherein the communication unit sourced the communication request and other sites that are adjacent to the first site.

10. The method of claim 7, wherein the site assignment request comprises an identification of specific sites.

11. The method of claim 7, wherein the site assignment request comprises an indication that a wide-area communication is desired.

12. The method of claim 7, wherein the site assignment request comprises any one of:
A) an identification of the site wherein the communication unit sourced the communication request;
B) an identification of a first site wherein the communication unit sourced the communication request and other sites that are adjacent to the first site;
C) an identification of specific sites; and
D) an indication that a wide-area communication is desired.

13. A method of allocating communication resources amongst a plurality of users belonging to a user group in a communication system having a plurality of sites, wherein each site includes at least one communication resource that is allocatable to support a communication, within an associated coverage area, comprising the steps of:
identifying, by a communication unit, sites where communication resources should be allocated when at least one member of the user group is active therein, yielding identifying information;
transmitting, by the communication unit, a communication request to support a communication amongst members of the user group, comprising the identifying information; and when the identifying information designates one or more specific sites, and when a wide-area communication including members of the user group has already been established and is currently ongoing, denying the communication request.

14. A method of allocating communication resources amongst a plurality of users belonging to a user group in a communication system having a plurality of sites, wherein each site includes at least one communication resource that is allocatable to support a communication within an associated coverage area, comprising the steps of:

identifying, by a communication unit, sites where communication resources should be allocated when at least one member of the user group is active therein, yielding identifying information;

transmitting, by the communication unit, a communication request to support a communication amongst members of the user group, comprising the identifying information; and when a non-wide-area communication including members of the user group has already been established and is currently ongoing, processing, by the communication systems the communication request as though the sites that are being used to support the non-wide-area communication are then currently unavailable.

15. The method of claim 14, wherein when the identifying information specifies sites that are not the same sites as those then being used to support the non-wide-area communication, allocating communication resources in the specified sites to support the communication request.

16. A method of requesting and using communication resources that are allocatable amongst a plurality of users belonging to a user group in a communication system having a plurality of sites, wherein each site includes at least one communication resource that is allocatable to support a communication within an associated coverage area, comprising the steps of:

identifying, by a communication unit, sites where communication resources should be allocated when at least one member of the user group is active therein, yielding identifying information;

generating, by the communication unit, a communication request, comprising the identifying information and transmitting, by the communication unit, the communication request; and using, by the communication unit, the communication resources that have been allocated in response to the communication request.

17. The method of claim 16, wherein the identifying information comprises an identification of the site wherein the communication unit sourced the communication request.

18. The method of claim 16, where the identifying information comprises an identification of a first site wherein the communication unit sourced the communication request and other sites that are adjacent to the first site.

19. The method of claim 16, wherein the identifying information comprises an identification of specific sites.

20. The method of claim 16, wherein the identifying information comprises an indication that a wide-area communication is desired.

21. A communication unit for use in a communication system having a plurality of sites, wherein each site includes at least one communication resource that is allocatable to support a communication within an associated coverage area, comprising:

A) an input device arranged and constructed to receive input from a user, wherein the input comprises identification of sites that the user desires included in a particular communication;

B) a controller, operably coupled to the input device, arranged and constructed to receive the input and to generate a communication resource request; and C) a transmitter, operably coupled to the controller, arranged and constructed to transmit the communication resource request.

22. A method of allocating communication resources in a communication system having a plurality of sites, wherein each site includes at least one communication resource that is allocatable to support a communication within an associated coverage area, comprising the steps of:

at a communication unit:

identifying information regarding at least one of the plurality of sites in which communication is desired by a user of the communication unit;

generating a communication request that comprises the information; and transmitting the communication request; and at a central controller:

receiving the communication request;

determining a user group in which the communication unit belongs;

determining if a call is currently in progress for the user group;

when a call in not currently in progress for the user group, assigning communication resources in at least one of the sites that have been identified by the information in the communication request.

\* \* \* \* \*